United States Patent
Touhsaent

[11] Patent Number: 6,013,353
[45] Date of Patent: *Jan. 11, 2000

[54] METALLIZED MULTILAYER PACKAGING FILM

[75] Inventor: Robert E. Touhsaent, Fairport, N.Y.

[73] Assignee: Mobil Oil Corporation, Fairfax, Va.

[*] Notice: This patent issued on a continued prosecution application filed under 37 CFR 1.53(d), and is subject to the twenty year patent term provisions of 35 U.S.C. 154(a)(2).

[21] Appl. No.: 08/646,429

[22] Filed: May 7, 1996

[51] Int. Cl.$^7$ ..................................... B32B 15/08
[52] U.S. Cl. ................. 428/203; 428/209; 428/409; 428/213; 428/461; 428/515; 428/516; 428/522
[58] Field of Search ............... 428/461, 457, 428/347, 353, 515, 516, 409, 203, 213, 522, 209

[56] References Cited

U.S. PATENT DOCUMENTS

| | | | |
|---|---|---|---|
| 3,753,769 | 8/1973 | Steiner | 117/122 H |
| 4,345,005 | 8/1982 | All et al. | 428/461 |
| 4,692,380 | 9/1987 | Reid | 428/349 |
| 4,695,503 | 9/1987 | Liu et al. | 428/207 |
| 4,749,616 | 6/1988 | Liu et al. | 428/331 |
| 4,865,908 | 9/1989 | Liu et al. | 428/248 |
| 5,126,198 | 6/1992 | Schinkel et al. | 428/349 |
| 5,419,960 | 5/1995 | Touhsaeut | 428/331 |
| 5,827,615 | 10/1998 | Touhsaent et al. | 428/463 |

FOREIGN PATENT DOCUMENTS 0312302   4/1989   European Pat. Off. .

Primary Examiner—Paul Thibodeau
Assistant Examiner—D. Lawrence Tarazano
Attorney, Agent, or Firm—Dennis P. Santini

[57] ABSTRACT

A metallized multilayer film comprising a film substrate having a polymer core layer, e.g., a polypropylene homopolymer (OPP), on at least one surface of which is a polymer skin layer having a lower melting temperature than that of said core layer, the exposed surface of skin layer having been treated, e.g., flame or corona discharge treated, prior to coating to increase its adherence to other materials, the film substrate containing a metal deposit, e.g., aluminum, coated on the treated surface of the polymer skin layers, and a polymeric, low temperature sealable coating (LTSC) comprising a copolymer of about 10 to 35 wt. % of at least one $\alpha,\beta$-ethylenically unsaturated carboxylic acid, e.g., acrylic or methacrylic acid, with about 65 to 90 wt. % of ethylene, an alkyl acrylate or methacrylate, acrylonitrile, or mixtures thereof on the surface of the metal deposit. Optionally, the polymer substrate may contain another polymer skin layer on the other side of the core layer, another coating may be deposited on the surface of the film opposite that containing the metal deposit, and/or a printed ink pattern and overlacquer may be applied to the surface of the LTSC on the metal deposit or the coated or uncoated opposite surface of the film substrate. The film has excellent mechanical and barrier properties and can be used to overwrap food and non-food products such that the package has a protected metal layer and good seal strength.

23 Claims, 1 Drawing Sheet

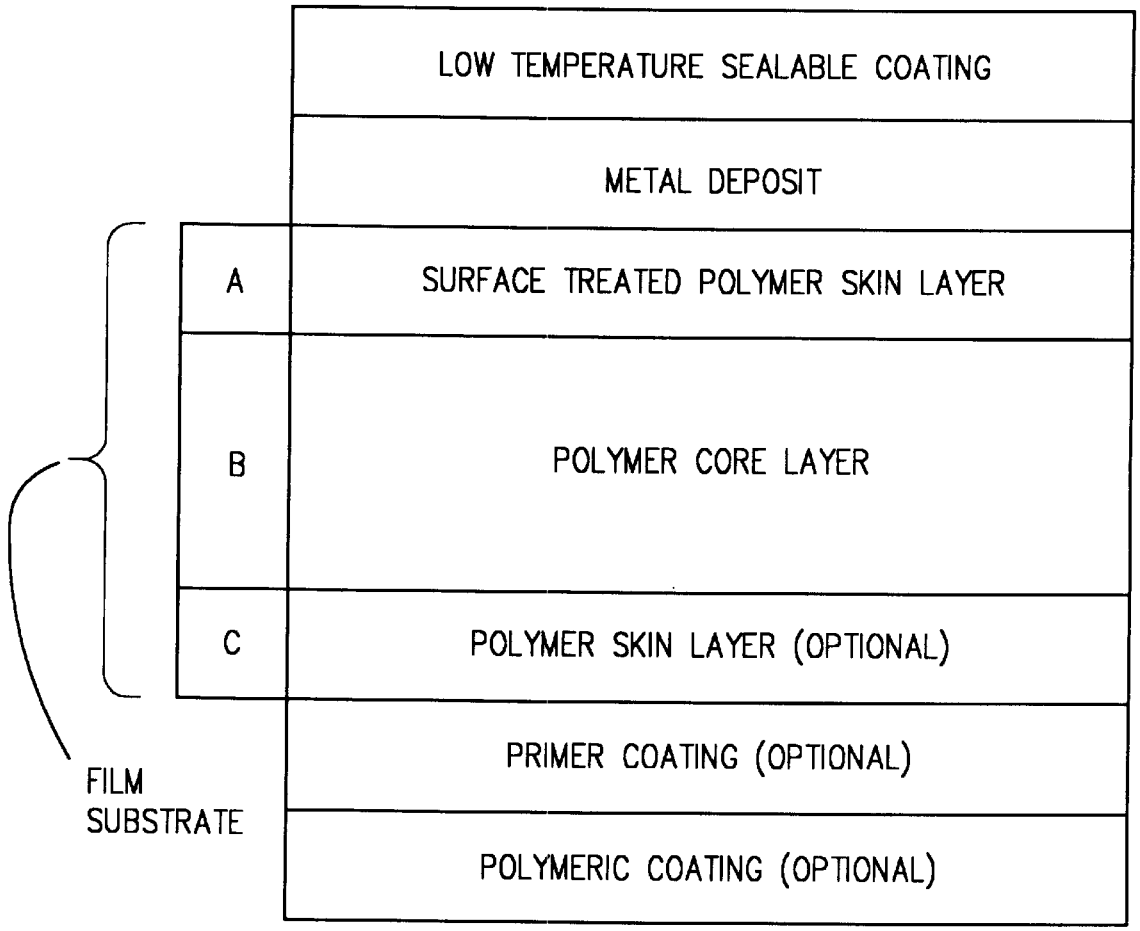
FIGURE

METALLIZED MULTILAYER PACKAGING FILM

BACKGROUND OF THE INVENTION

1. Field of the Invention

This invention relates to metallized multilayered packaging films utilized in the packaging of food or non-food products or in the formation of bags, cartons or pouch-type containers designed to hold such products.

2. Background Information Including Description of Related Art

Metallized plastic films having a polyolefin core layer, e.g., of oriented isotactic polypropylene homopolymer (OPP), have been widely utilized in food and non-food packaging and containers because of their desirable properties, e.g., resistance to the transmission of moisture, air, deleterious flavors and the like, as well as their excellent mechanical properties. However, a disadvantage of many of these films is the difficulty of covering the metal layer to protect the metal from scratches and obtain high seal strength. Thus, any means sufficient to overcome these difficulties would allow for the production of metallized films much better suited for packaging applications.

The following references may be pertinent to the claimed invention.

U.S. Pat. No. 4,345,005, issued Aug. 17, 1982 to All et al., discloses oriented polypropylene film having enhanced adhesion to metallized coatings produced by coextruding a film substrate having a polypropylene homopolymer core layer and a propylene-ethylene copolymer outer layer, biaxially orienting the film, and corona discharge treating the outer layer. A metal coating may then be deposited on the corona discharge treated layer.

U.S. Pat. No. 4,692,380, issued Sep. 8, 1987 to Reid, discloses metallized biaxially oriented polypropylene films produced by coextruding polypropylene homopolymer containing a fatty acid amide slip agent as the core layer with a propylene-ethylene copolymer which forms a thin layer on one surface of the polypropylene core layer, subjecting the propylene-ethylene layer to a corona discharge treatment, and metallizing the corona-discharge treated surface.

U.S. Pat. No. 5,126,198, issued Jun. 30, 1992 to Schinkel et al., discloses heat-laminatable multilayer films comprising a polypropylene base layer and at least one additional layer containing a mixture of an ethylene/vinyl acetate copolymer and an ethylene/acrylic acid copolymer.

SUMMARY OF THE INVENTION

In accordance with this invention, a metallized multilayer film suitable for packaging applications is provided comprising a film substrate having in cross-section a polymer, e.g., polypropylene homopolymer, core layer, on at least one surface of which is a skin layer of a polymer having a lower melting temperature than the polymer of the core layer, the exposed surface of such skin layer having been treated, e.g., flame or corona discharge treated, prior to coating to increase its adherence to other materials, such film substrate containing a metal layer, e.g., of aluminum, deposited on said treated skin layer surface and a low temperature sealable coating (LTSC) comprising a copolymer of about 10 to 35 wt. % of an α,β-ethylenically unsaturated carboxylic acid with about 65 to 90 wt. % of ethylene, an alkyl acrylate or methacrylate, acrylonitrile or a mixture thereof, deposited directly, i.e., without a primer, on the exposed surface of the metal layer. Optionally, the side of the film substrate opposite that containing the metal layer may also contain a skin layer of a polymer having a lower melting temperature than that of the core layer and also optionally, the surface of the film substrate opposite that containing the metal layer may contain a coating which may be a sealable coating, e.g., of the same type as that applied to the metal layer, or a different polymeric, film-forming coating of a type known in the art.

Optionally, a printed ink pattern may be applied to the surface of the sealable coating on the metal layer or on the coated or uncoated surface on the other side of the film, with an overlacquer applied to the surface containing the printed pattern to protect the pattern from damage. Also optionally, another film may be laminated to any surface of the metallized film which does not contain an overlacquer.

It has been found that the film of this invention is suitable for packaging applications where the metal layer is protected from damage by a sealable coating with good metal adhesion and high seal strength.

BRIEF DESCRIPTION OF THE DRAWING

The drawing illustrates in schematic form the various layers in the cross section of the preferred film of this invention as described in the foregoing Summary, and is self explanatory.

DETAILED DESCRIPTION OF THE INVENTION

The polymer of the core layer of the film of this invention generally has mechanical properties considered necessary or desirable in the film. In many cases, such polymer is a polyolefin having a melting point, for example, of at least about 125° C. and up to for example, about 190° C., and a relatively high degree of crystallinity. A particularly desirable polyolefin making up the core layer is an isotactic polypropylene homopolymer which is, for example, about 93 to 99% isotactic and has a crystallinity of about 70 to 80%, and a melting point, for example, of about 145° C. or higher, e.g., up to about 167° C.

Another desirable polymer suitable for the core layer of the film of this invention is a high density polyethylene (HDPE), which is a substantially linear polymer having a density, for example, of about 0.952 to 0.962 g/cc, a melting point of, for example, about 130° to 148° C. and a substantial degree of crystallinity.

If it is desired to produce a film which is opaque after being subjected to uniaxial or biaxial orientation as described hereinafter, microspheres may optionally be dispersed in the core layer polymer before extrusion and orientation of the film. Such microspheres are composed of a material higher melting than and immiscible with the core layer polymer and may be any of those disclosed, for example, in U.S. Pat. Nos. 4,377,616 and 4,632,869, the entire disclosures of which are incorporated by reference. Thus, the microspheres may be composed of a polymer, e.g., a polyester such a polybutylene terephthalate (PBT) or polyethylene terephthalate (PET), a nylon, an acrylic resin, or polystyrene, or an inorganic material such as glass, metal or ceramic. The preferred material for the microspheres is PBT. The particle size of the microspheres may be, for example, about 0.1 to 10 microns, preferably about 0.75 to 2 microns. The microspheres may be present in the core layer in an amount of up to about 20 wt. %, preferably about 6 to 12 wt. % based on the total weight of the core layer. To preserve the structural integrity of the microsphere-containing core layer, a thin layer of core layer polymer in the absence of microspheres may be coextruded on one or both sides of the microsphere-containing core layer polymer. In this case, the total of the microsphere-containing polymer layer and the non-microsphere-containing polymer layers may be considered the overall core layer of the film on each side of which is an adjacent skin layer having a greater adhesiveness to other materials than the core layer. When such a polymer substrate is subjected to uniaxial or biaxial orientation, a cavity forms around each microsphere giving the oriented film an opaque appearance.

The polymer of the skin layer adjacent to one or both surfaces of the core layer is preferably an extrudable hydrocarbon polymer such as a polyolefin having a lower melting point, e.g., at least about 5° C. lower and up to about 50° C. lower, than the polymer of the core layer. Polymers falling within this category when the core layer polymer is an isotactic polypropylene homopolymer are, for example, isotactic copolymers of propylene and a minor amount, e.g., about 1 to 10 wt. %, of one or more different 1-olefins, e.g., ethylene or a higher 1-olefin having, for example 4 to about 8 carbons atoms. Particularly suitable are isotactic copolymers of monomers consisting of propylene, ethylene in an amount of, for example 1 to 5 wt. % of the copolymer, and optionally, butylene in an amount, for example, of about 0.5 to 5 wt. % of the copolymer. Other polymers which can be used for the skin layers of the film substrate when the core layer polymer is an isotactic polypropylene homopolymer are, for example, high density polyethylene (HDPE), and linear low density polyethylene (LLDPE). If the core layer polymer is an HDPE, the polymer of the skin layers adjacent to the core layer may be any of the polymers disclosed previously as suitable for such layers when the core layer polymer is an isotactic polypropylene homopolymer except for HDPE itself, as long as the polymer has the requisite lower melting point than the HDPE making up the core layer. In this connection, it should be noted that the polymers of the skin layers may be the same or different. For example, when the core layer polymer is a polypropylene homopolymer, the skin layer polymer may be a terpolymer of propylene, ethylene and butylene on one surface of the core layer and HDPE on the other surface.

The polymer substrate of the metallized film of this invention comprising a core layer and one or two adjacent skin layers having a lower melting temperature than the core layer, is preferably prepared by coextruding the polymers of these layers. After such extrusion of the basic film substrate utilizing conventional extrusion techniques, the film is heated and molecularly oriented in the longitudinal, i.e., machine, direction and optionally in the transverse direction. This uniaxial or biaxial orientation, which greatly improves the stiffness and tensile strength properties of the film, is accomplished by utilizing conventional techniques to stretch sequentially the film, for example, about three to eight times in the machine direction and optionally, five to twelve times in the transverse direction, at a drawing temperature of about 100 to 200° C. In most cases, a coextruded film having a core layer of polypropylene homopolymer would be biaxially oriented, while a film having a core layer of LDPE would be uniaxially oriented, i.e., only in the machine direction.

For some purposes, it may be desirable to produce the polymer substrate comprising the core and one or two adjacent skin layers by a cast film or chill roll extrusion process rather than a coextrusion and orientation process. In this case, the final polymer substrate is essentially unoriented and the final metallized film is generally much less stiff than films in which the substrate is prepared by a coextrusion and orientation process.

Before applying the metal, primer or polymeric, film-forming coatings to the surfaces of the film substrate, as described hereinafter, the surfaces intended to receive the metal coating and optionally the opposite surface are treated to insure that the coatings will be strongly adherent to the film substrate, thereby eliminating the possibility of the coatings peeling or being stripped from the film. This treatment can be accomplished by employing known prior art techniques such as for example, film chlorination, i.e., exposure of the film to gaseous chlorine, treatment with oxidizing agents such as chromic acid, hot air or steam treatment, flame treatment, corona discharge treatment, and the like. Flame or corona discharge treatment of the surfaces is preferred in the production of the films of this invention.

In general, an uncoated and surface treated film substrate produced by a coextrusion and orientation process has a thickness, for example, of about 0.5 to 3.0 mils. Of particular interest are two or three layer films wherein the core layer has a thickness, for example, of about 80 to 99% of the total thickness of the film and the one or two adjacent skin layers each has a thickness of, for example, about 1 to 10% of the total thickness of the film. If two skin layers are present, their thicknesses may be the same or different. Application of a metal layer to a treated surface of the film substrate is usually accomplished by conventional vacuum deposition although other methods known in the art such as electroplating or sputtering may also be used. Aluminum is preferred as the metal utilized for this purpose although other metals similarly capable of being deposited such as gold, zinc, copper, silver and others known in the art may also be utilized for certain purposes.

As stated, a low temperature sealable coating (LTSC) is applied to the metallized surface of the film without a primer, such coating comprising a base copolymer of about 10 to 35 wt. % of an $\alpha,\beta$-ethylenically unsaturated carboxylic acid, with about 65 to 90 wt. % of ethylene, an alkyl acrylate or methacrylate, acrylonitrile, or mixtures thereof. The latter unsaturated acid may be, for example, acrylic acid, methacrylic acid, maleic acid, crotonic acid, itaconic acid, citraconic acid, or mixtures thereof. Preferably, the base copolymer is a copolymer of about 65 to 90 wt. %, more preferably about 75 to 85 wt. % of ethylene, and about 10 to 35 wt. %, preferably about 15 to 25 wt. % of acrylic acid (an EAA copolymer) or methacrylic acid (an EMA copolymer). The copolymer may have a number average molecular weight (Mn) of, for example, about 2,000 to 50,000, preferably about 4,000 to 10,000.

The base carboxylic acid copolymer in the low temperature sealable coating applied to the metallized surface is often obtained as a solution or fine dispersion of an ammonium salt of the copolymer in an ammoniacal water solution. When the copolymer is dried, ammonia is given off and the ionized and water sensitive carboxylate groups are converted to largely unionized and less water sensitive free carboxyl groups. In practicing this invention, however, there may be added to the solution or dispersion of the ethylene copolymer an amount of ions of at least one metal from Group Ia, IIa or IIb of the Periodic Table, preferably, sodium, potassium, lithium, calcium or zinc ions, and most preferably sodium ions, e.g., in the form of their hydroxides. The quantity of such metallic ions may be in the range sufficient to neutralize, for example, about 2 to 80%, preferably about 10 to 50% of the total carboxylate groups in the copolymer. The presence of such metallic ions has been found in many cases to result in an improvement in certain properties, e.g., coefficient of friction (COF), hot tack, and blocking, without an unacceptable sacrifice of other properties, e.g., low minimum seal temperatures (MST).

When the base copolymer in the sealable coating applied to the metallized surface is an EAA copolymer of 80 wt. % of ethylene and 20 wt. % of acrylic acid and the neutralizing metal ions are sodium ions added as sodium hydroxide, then the amount of sodium hydroxide added corresponding to the foregoing percentages of carboxylate groups neutralized, may be, for example, about 0.33 to 8.8 phr, preferably about 1.1 to 5.5 phr, where "phr" stands for parts by weight per hundred parts of the total resin, which is the same as the EAA copolymer when no other resin is present. For the purpose of determining the phr of various additives present in the coating, all the carboxylate groups of the ethylene copolymer are assumed to be in their free carboxyl (—COOH) form.

In addition to the carboxylic acid-containing base copolymer, the sealable coating applied to the metallized surface may also contain a dispersed wax, e.g., a relatively large particle size carnauba or microcrystalline wax as an anti-blocking agent. Other waxes which may be used are, for example, natural waxes such as paraffin wax, beeswax, japan wax, montan wax, etc., and synthetic waxes such as hydrogenated castor oil, chlorinated hydrocarbon waxes, long chain fatty acid amides, etc. The wax may be present in the coating in an amount of, for example, about 2 to 12 phr, preferably about 3 to 5 phr.

In addition to functioning as an anti-blocking material, the wax when incorporated into the coatings of the present invention also functions to improve the "cold-slip" properties of the films coated therewith, i.e., the ability of a film to satisfactorily slide across surfaces at about room temperature.

The sealable coating applied to the metallized surface of the film may also contain a particulate material, e.g., an amorphous silica, for the purpose of further reducing the tack of the coating at room temperature. Amorphous silica is composed of particles which are agglomerations of smaller particles and which have an average particle size of, for example, about 2 to 9 microns, preferably about 3 to 5 microns, and may be present in the sealable coating in an amount, for example, of about 0.1 to 2.0 phr, preferably about 0.2 to 0.4 phr.

Other optional additives which may be included in the sealable coating applied to the metallized surface of the film include other particulate materials such as talc which may be present in an amount, for example, of about 0 to 2 phr, cross-linking agents such as melamine formaldehyde resins which may be present in an amount, for example, of 0 to 20 phr, and anti-static agents such as poly(oxyethylene) sorbitan monooleate which may be present in an amount, for example, of about 0 to 6 phr. An anti-bacterial agent may also be present.

In addition to the low temperature sealable coating on the metallized surface of the film as previously described, a polymeric, film-forming coating may optionally be applied to the surface of the film opposite the metallized surface. However, to ensure adherence of this coating to such opposite surface of the film substrate, a coating of primer is first applied to such surface, either after the skin layer on such surface is treated to increase further its adhesiveness to other materials, e.g., by corona discharge or flame treating, or in the absence of such treatment. Primer materials which are suitable are well known in the art and include, for example, titanates, poly(ethyleneimine), and reaction products of an epoxy resin and an aminoethylated vinyl polymer. The primer is applied to the treated surface of the film substrate by conventional solution coating means. A particularly effective primer herein is poly(ethylene imine) applied as either an aqueous or organic solvent e.g., ethanol, solution, or as a solution in a mixture of water and organic solvent, containing about 0.5 wt. % of the imine.

The coating applied to the primer-containing surface of the film opposite the metallized surface may be a sealable coating of the same type as that applied to the metallized surface or it may be any of other types of polymeric, film-forming coatings known in the art. A particularly suitable coating is one containing as a film-forming component an interpolymer of 1) about 18 to 80 wt. % of at least one $C_1$–$C_4$ alkyl methacrylate, 2) about 18 to 80 wt. % of at least one $C_1$–$C_4$ alkyl acrylate, and 3) about 1 to 15 wt. % of at least one $\alpha,\beta$-ethylenically unsaturated carboxylic acid based on the weight of the polymer (an "acrylic terpolymer"); and colloidal silica as a hot slip agent in an amount, for example of about 30 to 60 phr and having a particle size of, for example, about 10 to 200 millimicrons. The unsaturated acid of the acrylic terpolymer may be any of those disclosed previously as suitable for the copolymer in the low temperature sealable coating applied to the metallized surface of the film, although acrylic and/or methacrylic acid are preferred. The copolymer may be utilized in the coating composition as a partially neutralized aqueous solution or as a dispersion, i.e., a latex. Additives may be present in the coating compositions which are the same or similar in nature and amount as those disclosed previously as suitable in the low temperature sealable coating applied to the metallized surface of the film, particularly a wax such as carnauba wax which functions as an antiblocking and cold slip agent, and talc which acts as a lubricant. This type of composition is disclosed, for example, in U.S. Pat. Nos. 3,753,769 and 4,749,616, the entire disclosures of which are incorporated herein by reference.

Another type of polymeric coating which may be applied to the surface of the film opposite the metallized surface in conjunction with a primer is a coating in which the film-forming component is a polymer of at least about 50 wt. % of vinylidine chloride, preferably about 75 to 92 wt. % of vinylidine chloride, 2 to 6 wt. % of an $\alpha,\beta$-ethylenically unsaturated acid such as any of those disclosed previously as suitable for the copolymers in sealable coatings and the remainder a $C_1$–$C_4$ alkyl acrylate or methacrylate, or acrylonitrile. Additives the same or similar to those disclosed previously in other coatings may also be present in these coatings. The vinylidine chloride copolymer may be utilized as a partially neutralized aqueous solution or as an aqueous dispersion, i.e., a latex. This type of coating is disclosed, for example, in U.S. Pat. No. 4,944,990, the entire disclosure of which is incorporated by reference.

The contemplated low temperature sealable coating (LTSC) composition is applied to the metallized surface of the polymer film, and, if used, the primer and polymeric coatings to the opposite surface, in any suitable manner such as by gravure coating, roll coating, dipping, spraying, etc. The excess aqueous solution can be removed by squeeze rolls, doctor knives, etc. The coating compositions will ordinarily be applied in such an amount that there will be deposited following drying, a smooth, evenly distributed layer of from about 0.2 to about 1 gram/1000 sq. in. of film surface. In general, the thickness of the applied LTSC is such that it is sufficient to impart the desired sealability, coefficient of friction (COF), and hot slip characteristics to the substrate polymer film.

The coating once applied to the film is subsequently dried by hot air, radiant heat or by any other suitable means thereby providing a non-water soluble, adherent, glossy coated film product useful, for example, as a packaging film.

A printed ink pattern may be applied to the coating on either surface of the film, or to the uncoated surface opposite the metallized surface if no coating is applied to such opposite surface, using, for example a conventional solvent-based ink composition. The printed pattern may be covered with an overlacquer to prevent the pattern from damage. The overlacquer may cover the entire surface containing the printed pattern, in which case sealing is accomplished solely by the softening of the coating or a polymer skin layer on the opposite surface of the film on the portion of the film constituting the outer film of the seal. However, if an "in to out" seal is also desired wherein sealing is also accomplished by the softening of the coating or polymer skin layer on the surface containing the printed ink pattern, a portion of which constitutes the inner film of the seal, then the printing and overlacquering is done in a pattern to allow the coating or polymer skin layer to be exposed in the sealing region.

Optionally, another film (the "laminating film") may be laminated to a surface of the metallized film of this invention, to which an overlacquer has not been applied, for the purpose of improving the mechanical properties, e.g., tear strength, and machinability, increasing the stiffness, protecting the printed pattern and/or providing hermetic seals of the metallized film. Thus, the laminating film may be bonded to a sealable coating on either the metallized surface or the opposite surface of the film of this invention, either after a printed pattern has been applied to the sealable coating or in the absence of such printed pattern, or the bonding of the laminated film may be to said opposite surface in the absence of any sealable coating. The laminating film may, for example, comprise a polymer having superior mechanical properties, e.g., isotactic polypropylene homopolymer, which is bonded to the film of the invention using as an adhesive molten polymer having a lower melting point than the laminating polymer, e.g., low density polyethylene (LDPE), or the laminating film may comprise a major layer of such polymer of superior mechanical properties and a minor layer of a polymer having a lower melting temperature than the polymer of the major layer with the lamination being accomplished by pressing the surface of the laminating film containing such minor layer against the desired surface of the metallized film of the invention at a temperature high enough to render tacky the polymer of the minor layer. The methods and equipment necessary to accomplish the described bonding are well-known in the art.

The following example further illustrates the invention.

EXAMPLE

A three layer film is extruded with a core layer of an isotactic polypropylene homopolymer sold as Fina 3371, a coextruded skin layer of HDPE on one surface of the core layer, and a coextruded skin layer of an isotactic terpolymer of over 90 wt. % of propylene and 1–5 wt. % each of ethylene and butene-1, sold as Chisso 7780 on the other surface of the core layer. The HDPE skin layer was composed of 97.5 wt % of a pure HDPE sold as Exxon HX0353.67, 0.5 wt. % of a fluoropolymer to prevent die build up sold as Huntsman Polcomm A27527, and 2.0 wt. % of a master batch of HDPE with high stabilizer to prevent gels.

The coextrudate was quenched at 30–50° C., reheated to 115° C. and stretched in the machine direction 5 times using transport rolls operating at different speeds. After the desired machine direction, the film was transversely stretch oriented 8 times, at an appropriate temperature profile ranging from 155°–180° C.

Referring to the drawing, the resulting film substrate had an overall optical gauge thickness of 70 ga. (gauge, 1/100 mil) with a core layer of 62 ga. (layer B), an HDPE skin layer of 2 ga., (layer A) and a propylene-ethylene-butene-1 terpolymer skin layer of 6 ga., (layer C). Subsequently the HDPE skin layer was flame treated and metallized by vacuum deposition of aluminum under standard conditions for high barrier aluminum metallizing to an optical density of about 2.3.

For application to the metallized surface of the film, a sealable coating composition is prepared by adding to an aqueous solution or fine dispersion of 25 wt. % of an ammonium salt of a copolymer of 80 wt. % of ethylene and 20 wt. % of acrylic acid, sold by Michelman as MichemPrime 4983 EAA, 1.5 phr (parts by weight per hundred parts of the copolymer) of sodium hydroxide (NaOH), 4 phr of carnauba wax sold by Michelman as MichemLube 215, 0.4 phr of talc, and 0.3 phr of amorphous silica sold as Syloid 42. All the components are added as an aqueous dispersion or solution. Water is then added to bring the final coating composition to a solids content of about 12 wt. %.

The coating composition was applied to the metallized surface of the film in the absence of a primer using standard gravure and coating apparatus and techniques, and the coating was dried at 240° F. The total coating weight on the film following drying was from 0.65 gram/1,000 in$^2$ of film.

The untreated surface of the film substrate which is opposite the metallized surface and which contains a skin layer of a propylene-ethylene-butene-1 terpolymer, was first primed with a 0.5 wt. % solution of poly(ethyleneimine) in a mixture of 85 percent water and 15 percent ethanol. The primed surface was then coated with a composition comprising an aqueous dispersion or solution of a terpolymer of methyl methacrylate, ethyl acrylate and methacrylic acid, colloidal silica, and carnauba wax, with a total solids content of about 13 wt. %, as described in U.S. Pat. No. 2,753,769, to a coating weight of about 0.6 gm/1000 in$^2$ of film, using standard gravure coating apparatus and techniques and a drying temperature of 240° C.

The coated film of this example was tested for Water Vapor Transmission Rate (WVTR) in g/100 in$^2$/day measured at 100° F. and 90% R.H., Oxygen Transmission Rate (OTR) in cc/100in$^2$/day measured at 73° F. and 0% R.H., Minimum Seal Temperature (MST) in degrees F to obtain 100 gm/in flat seal with metallized HDPE (A) layer, and the crimp seal strength (CRIMP) of the metallized HDPE (A) layer at 20 psi, 0.75 sec. and 260° F. The values of these properties obtained as compared with values obtained for an identical but uncoated film control on both surfaces are shown in the Table.

TABLE

| Test | Coated Film of the Example | Uncoated Film Control |
| --- | --- | --- |
| OTR | 1.51 | 2.87 |
| WVTR | 0.008 | 0.012 |
| CRIMP | 493 | No seal |
| MST | 209 | No seal |

As can be seen in the foregoing table, excellent water vapor barrier and moderate oxygen barrier and sealability were produced in a single film. This structure can be used to replace the paper/poly/foil/poly structure (but with a metallized look because the base film is clear) by itself or in lamination to provide a stiffer film with locked in print or a thicker sealant layer. Cavitation can be added to the base film to make it opaque.

I claim:

1. A metallized multilayer packaging film comprising a film substrate having a polymer core layer on at least one surface of which is a first polymer skin layer having a lower melting temperature than that of said core layer, the exposed surface of said first skin layer having been treated prior to coating to increase its adherence to other materials, said film substrate containing a metal deposit obtained by a method selected from the group consisting of vacuum deposition and sputtering on said treated first skin layer surface and a polymeric low temperature sealable coating (LTSC) comprising a copolymer of about 10 to 35 wt. % of at least one α, β-ethylenically unsaturated carboxylic acid with about 65 to 90 wt. % of ethylene, an alkyl acrylate or methacrylate, acrylonitrile, or mixtures thereof, on the surface of said metal deposit, wherein the polymer of the core layer is an isotactic polypropylene homopolymer or a high density polyethylene (HDPE).

2. The film of claim 1 wherein said core layer contains on its surface opposite that containing the metal deposit a second skin layer having a melting temperature lower than that of the core layer.

3. The film of claim 1 wherein said core layer polymer is an isotactic polypropylene homopolymer.

4. The film of claim 3 wherein the polymer of said surface treated first skin layer is an isotactic copolymer of propylene, ethylene, and optionally butene-1.

5. The film of claim 4 wherein the polymer of said first surface treated skin layer is a copolymer of about 90 to 99 wt. % propylene and about 1 to 5 wt. % of ethylene and optionally, about 0.5 to 5 wt. % of butene-1.

6. The film of claim 4 wherein said core layer contains on its surface opposite that containing the metal deposit a second skin layer having a melting temperature lower than that of the core layer.

7. The film of claim 6 wherein said second skin layer is a high density polyethylene (HDPE).

8. The film of claim 3 wherein the layers of said film substrate have been coextruded and the film is biaxially oriented.

9. The film of claim 1 wherein said treatment of the surface of a skin layer to increase its adherence to other materials is a flame or corona discharge treatment.

10. The film of claim 1 wherein said metal deposit is aluminum.

11. The film of claim 1 wherein said LTSC copolymer is a copolymer of ethylene and acrylic acid (EAA copolymer) or methacrylic acid (EMA copolymer) wherein about 2 to 80% of the carboxylate groups are neutralized with metal ions from Groups IA, IIA or IIB of the Periodic Table.

12. The film of claim 11 wherein said EAA or EMA copolymer is a copolymer of about 75 to 85 wt. % of ethylene and 15 to 25 wt. % of acrylic or methacrylic acid, in which about 10 to 50% of the carboxylate groups are neutralized with sodium, potassium, calcium or zinc ions.

13. The film of claim 11 wherein said EAA or EMA copolymer is an EAA copolymer.

14. The film of claim 12 wherein said carboxylate ions are neutralized with sodium ions.

15. The film of claim 1 wherein the surface of the film opposite that containing said metal deposit contains a polymeric coating deposited thereon.

16. The film of claim 15 wherein said coating on the surface opposite that containing the metal deposit comprises an interpolymer of 1) about 18 to 80 wt. % of at least one $C_1$–$C_4$ alkyl methacrylate, 2) about 18 to 80 wt. % of at least one $C_1$–$C_4$ alkyl acrylate, and 3) about 1 to 15 wt. % of at least one α,β-ethylenically unsaturated carboxylic acid based on the weight of the polymer; and colloidal silica as a hot slip agent.

17. The film of claim 16 wherein said interpolymer is a terpolymer of methyl acrylate, methyl methacrylate and methyacrylic acid.

18. The film of claim 15 wherein said coating on the surface opposite that containing the metal deposit is deposited directly on a primer coating which is deposited directly on the film substrate.

19. The film of claim 18 wherein said primer coating comprises polyethyleneimine.

20. The film of claim 15 containing on the surface of one of said coatings a printed ink pattern, and an overlacquer coating applied after the printed ink pattern.

21. The film of claim 20 wherein said overlacquer coating has a pattern which allows the coating on which the ink pattern is deposited to be exposed in the sealing region.

22. The film of claim 8 wherein said biaxially oriented film substrate prior to coating has a thickness of about 0.5 to 3 mils.

23. The film of claim 22 wherein said biaxially oriented film substrate has an oriented polypropylene homopolymer (OPP) core layer which is about 80 to 99% of its total thickness and each skin layer present has a thickness of about 1 to 10% of the total thickness.

* * * * *